(12) United States Patent  (10) Patent No.: US 8,426,075 B2
Morita  (45) Date of Patent: Apr. 23, 2013

(54) FUEL CELL SYSTEM, AND OPERATION METHOD FOR FUEL CELL

(75) Inventor: Tohru Morita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1241 days.

(21) Appl. No.: 12/294,494

(22) PCT Filed: Mar. 27, 2007

(86) PCT No.: PCT/IB2007/000770
§ 371 (c)(1),
(2), (4) Date: Sep. 25, 2008

(87) PCT Pub. No.: WO2007/110747
PCT Pub. Date: Oct. 4, 2007

(65) Prior Publication Data
US 2010/0227242 A1  Sep. 9, 2010

(30) Foreign Application Priority Data

Mar. 29, 2006 (JP) .................................. 2006-092576

(51) Int. Cl.
*H01M 8/04* (2006.01)
(52) U.S. Cl.
USPC ........................ 429/450; 429/428; 429/400
(58) Field of Classification Search ............ 429/450
See application file for complete search history.

(56) References Cited

U.S. PATENT DOCUMENTS

| 7,029,775 B2 * | 4/2006 | Horiguchi et al. | 429/409 |
| 2004/0013935 A1 | 1/2004 | Ye et al. | |
| 2004/0038098 A1 * | 2/2004 | Imamura et al. | 429/25 |
| 2004/0115500 A1 * | 6/2004 | Ogami et al. | 429/32 |
| 2004/0115517 A1 * | 6/2004 | Fukuda et al. | 429/44 |
| 2006/0042965 A1 * | 3/2006 | Sasaki et al. | 205/784 |
| 2006/0199051 A1 * | 9/2006 | Bai et al. | 429/17 |

FOREIGN PATENT DOCUMENTS

| JP | 2003-508877 A | 3/2003 |
| JP | 2004-022503 A | 1/2004 |
| JP | 2004-127914 A | 4/2004 |
| JP | 2004-152588 A | 5/2004 |
| JP | 2004-158274 A | 6/2004 |
| WO | WO 01/15247 A2 | 3/2001 |

OTHER PUBLICATIONS

Office Action issued Mar. 13, 2012 in JP 2006-092576 and English translation thereof.

* cited by examiner

*Primary Examiner* — Raymond Alejandro
*Assistant Examiner* — Gary Harris
(74) *Attorney, Agent, or Firm* — Kenyon & Kenyon LLP

(57) ABSTRACT

A fuel cell system includes a fuel cell that includes a solid polymer electrolyte membrane and an anode catalyst layer having a water-electrolytic catalyst, a movement portion that moves water from an oxygen electrode of the fuel cell to a side of a fuel electrode, a water content detection portion that detects the water content of the solid polymer electrolyte membrane, and a control portion that controls the movement portion on the basis of a result of detection of the water content detection portion.

11 Claims, 9 Drawing Sheets

F I G . 10
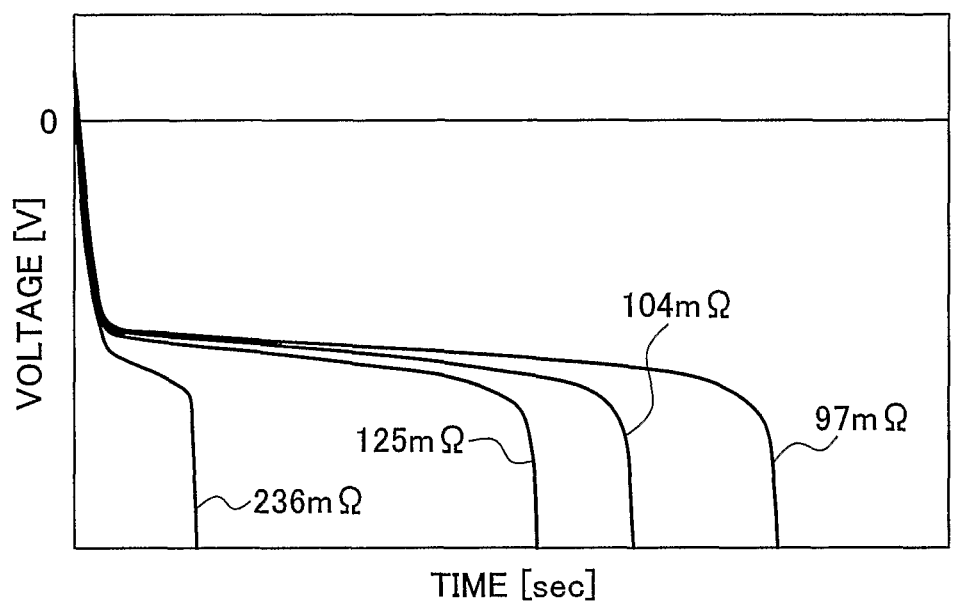

FUEL CELL SYSTEM, AND OPERATION METHOD FOR FUEL CELL

This is a 371 national phase application of PCT/IB2007/000770 filed 27 Mar. 2007, claiming priority to Japanese Patent Application No. 2006-092576 filed 29 Mar. 2006, the contents of which are incorporated herein by reference.

BACKGROUND OF THE INVENTION

1. Field of the Invention

The invention relates to a fuel cell system and an operation method for a fuel cell.

2. Description of the Related Art

A fuel cell is generally a device that produces electric energy through the use of hydrogen and oxygen as fuels. The fuel cell, being excellent in terms of environmental quality and capable of realizing high-energy efficiency, has been widely studied and developed as a future energy supply system.

For example, a solid polymer electrolyte fuel cell has a structure in which a catalyst layer and a gas diffusion layer are stacked in that order on both sides of a solid polymer electrolyte membrane that has proton conductivity. At the time of fuel lack in such a solid polymer electrolyte fuel cell, electrolysis of the water produced as a result of electric power generation, occurs at an anode side to produce protons. Due to this electrolysis, protons can be supplied to the electrolyte membrane. However, when the electrolysis of water ceases to progress, there is a risk of degradation of the fuel electrodes due to oxidation. Published Japanese Translation of PCT Application, JP-T-2003-508877, discloses a technology in which a water-electrolytic catalyst is mixed in fuel electrodes. According to this technology, the electrolysis of the power generation-produced water can be accelerated through the water-electrolytic catalyst.

However, water freezes below the freezing point. Therefore, when fuel becomes lacking below the freezing point, there is no water to be electrolyzed. In such a case, water content in the solid polymer electrolyte membrane is extracted to the fuel electrode, and is electrolyzed. In consequence, there is a risk of degradation of the solid polymer electrolyte membrane.

SUMMARY OF THE INVENTION

It is an object of the invention to provide a fuel cell system and an operation method for a fuel cell, which are capable of performing the electrolysis of water at the time of fuel lack without degrading the fuel electrode and the solid polymer electrolyte membrane.

A first aspect of the fuel cell system in accordance with the invention includes: a fuel cell that includes a solid polymer electrolyte membrane, and an anode catalyst layer having a water-electrolytic catalyst; movement means (movement portion) for moving water so as to move water from an oxygen electrode of the fuel cell to a side of a fuel electrode; water content detection means (water content detection portion) for detecting a water content of the solid polymer electrolyte membrane; and control means (control portion) for controlling the movement means on the basis of a result of detection of the water content detection means.

In the first aspect of the fuel cell system in accordance with the invention, since the anode catalyst layer contains the water-electrolytic catalyst, the electrolysis of water held in the anode catalyst layer is accelerated. Therefore, even when the fuel is lacking, the irreversible degradation of the anode catalyst layer can be restrained. Furthermore, water moves from the side of the oxygen electrode to the side of the fuel electrode due to the movement means, on the basis of the water content of the solid polymer electrolyte membrane. In this case, even if water is insufficient in the fuel electrode side, water in the oxygen electrode side is supplied to the solid polymer electrolyte membrane and the fuel electrode. Therefore, decline of the water content amount in the solid polymer electrolyte membrane can be restrained. As a result, degradation of the solid polymer electrolyte membrane can be restrained.

The control means in the invention includes first determination means for determining whether or not the water content of the solid polymer electrolyte membrane declines. The control means may control the movement means so as to move water from the oxygen electrode to the fuel electrode, if it is determined by the first determination means that the water content of the solid polymer electrolyte membrane declines. In this case, water moves from the oxygen electrode side to the fuel electrode side if the water content of the solid polymer electrolyte membrane declines. Therefore, decline of the water content amount in the solid polymer electrolyte membrane can be restrained. Besides, unnecessary action of the movement means can be omitted.

The movement means may include back-pressure adjustment means for adjusting a back pressure of an oxidant gas that is supplied to the fuel cell. In this case, the movement means can move water from the oxygen electrode side to the fuel electrode side by increasing the back-pressure of the oxidant gas. Besides, the control means may control the back-pressure adjustment means so that the back pressure of the oxidant gas increases, if it is determined by the first determination means that the water content of the solid polymer electrolyte membrane declines. In this case, water moves from the oxygen electrode side to the fuel electrode side if the water content of the solid polymer electrolyte membrane declines. Therefore, decline of the water content amount in the solid polymer electrolyte membrane can be restrained. Besides, unnecessary action of the back-pressure adjustment means can be omitted.

The movement means may include a heater that heats the fuel cell. In this case, by heating the fuel cell through the heater, the water permeation rate of the solid polymer electrolyte membrane increases. Therefore, water moves more readily in the solid polymer electrolyte membrane. As a result, the movement means can move water from the oxygen electrode side to the fuel electrode side. Furthermore, the control means may control the heater so that temperature of the fuel cell rises, if it is determined by the first determination means that the water content of the solid polymer electrolyte membrane declines. In this case, water moves from the oxygen electrode side to the fuel electrode side if the water content of the solid polymer electrolyte membrane declines. Therefore, decline of the water content amount in the solid polymer electrolyte membrane can be restrained. Besides, unnecessary action of the heater can be omitted.

The water content detection means may include resistance detection means for detecting an electrical resistance of the solid polymer electrolyte membrane. The first determination means may determine that the water content of the solid polymer electrolyte membrane declines, if the electrical resistance of the solid polymer electrolyte membrane increases. Furthermore, the fuel cell system according to the invention further includes a fuel cell stack in which a plurality of fuel cells are stacked, and the water content detection means may include load detection means for detecting a fastening load of the fuel cell stack. The first determination means may determine that the water content of the solid polymer electrolyte membrane declines, if the fastening load of the fuel cell stack declines.

The control means may include second determination means for determining whether or not the fuel cell is in a state of fuel lack. The control means may control the movement means so as to move water from the oxygen electrode to the fuel electrode, if it is determined by the second determination means that the fuel cell is in the state of fuel lack and it is determined by the first determination means that the water content of the solid polymer electrolyte membrane declines. In this case, if the fuel cell is in the state of fuel lack, sufficient water for electrolysis can be moved to the fuel electrode. Therefore, degradation of the solid polymer electrolyte membrane can be restrained, and oxidative degradation of the fuel electrode can be restrained.

The fuel cell system of the invention may further include generated voltage detection means for detecting a generated voltage of the fuel cell. The second determination means may determine that the fuel cell is in the state of fuel lack, if the generated voltage of the fuel cell is less than or equal to a predetermined value. Furthermore, the fuel cell system may further include temperature detection means for detecting temperature of the fuel cell. The control means may control the movement means so as to move water from the oxygen electrode side to the fuel electrode side, if the temperature of the fuel cell is below the water freezing point and it is determined by the first determination means that the water content of the solid polymer electrolyte membrane declines.

An operation method for a fuel cell in accordance with the invention includes: the step of detecting a water content of a solid polymer electrolyte membrane in a fuel cell that includes, besides the solid polymer electrolyte membrane, an anode catalyst layer having a water-electrolytic catalyst; the step of determining whether or not the water content of the solid polymer electrolyte membrane declines; and the step of moving water from an oxygen electrode of the fuel cell to a side of a fuel electrode, if it is determined in the determining step that the water content of the solid polymer electrolyte membrane declines.

In the operation method for the fuel cell in accordance with the invention, since the anode catalyst layer contains the water-electrolytic catalyst, the electrolysis of water held in the anode catalyst layer is accelerated. Therefore, even when the fuel is lacking, the irreversible degradation of the anode catalyst layer can be restrained. Furthermore, water moves from the oxygen electrode side to the side of the fuel electrode if the water content of the solid polymer electrolyte membrane declines. In this case, even if water is insufficient in the fuel electrode side, water from the oxygen electrode side can be electrolyzed. Therefore, decline of the water content amount in the solid polymer electrolyte membrane can be restrained. As a result, degradation of the solid polymer electrolyte membrane can be restrained.

The step of moving may include the step of increasing a back-pressure of an oxidant gas by back-pressure adjustment means for adjusting the back-pressure of the oxidant gas supplied to the fuel cell. In this case, by increasing the back-pressure of the oxidant gas, water can be moved from the oxygen electrode side to the fuel electrode side. Therefore, decline of the water content of the solid polymer electrolyte membrane can be restrained, and the electrolysis of water in the fuel electrode can be continued.

The step of moving may include the step of raising temperature of the fuel cell by a heater. In this case, by raising the temperature of the fuel cell by the heater, the water permeation rate of the solid polymer electrolyte membrane is increased. Therefore, water moves more readily in the solid polymer electrolyte membrane. In consequence, decline of the water content of the solid polymer electrolyte membrane can be restrained, and the electrolysis of water in the fuel electrode can be continued.

The step of determining may include the step of determining that the water content of the solid polymer electrolyte membrane declines, if the electrical resistance of the solid polymer electrolyte membrane increases. Beside, the step of determining may include the step of determining that the water content of the solid polymer electrolyte membrane declines, if a fastening load of a fuel cell stack in which a plurality of fuel cells are stacked declines.

The step of detecting the water content may be performed if a generated voltage of the fuel cell is less than or equal to a predetermined value. Besides, the step of detecting the water content may be performed if temperature of the fuel cell is below the water freezing point.

According to the invention, even if water becomes insufficient at the fuel electrode side, water can be electrolyzed in the fuel electrode by moving water from the oxygen electrode side to the fuel electrode side. Therefore, decline of the water content amount in the solid polymer electrolyte membrane can be restrained. As a result, degradation of the solid polymer electrolyte membrane can be restrained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 10 is a diagram showing a relationship between the generated voltage of a fuel cell and the electrical resistance of the electrolyte membrane.

DETAILED DESCRIPTION OF THE PREFERRED EMBODIMENTS

Best modes for carrying out the invention will be described below.

Figure 1:
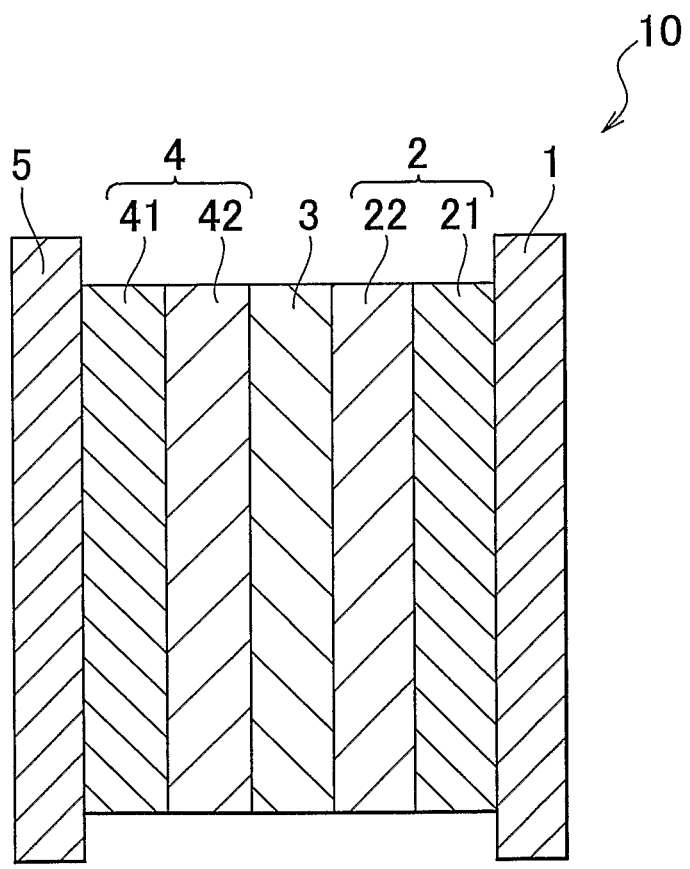
FIG. 1 is a schematic sectional view of a fuel cell.

A fuel cell system 100 in accordance with a first embodiment of the invention will be described below. Firstly, a fuel cell 10 that constitutes a fuel cell stack 31 included in the fuel cell system 100 will be described. FIG. 1 is a schematic sectional view of the fuel cell 10. As shown in FIG. 1, the fuel cell 10 has a structure in which a separator 1, a fuel electrode 2, an electrolyte membrane 3, an oxygen electrode 4 and a separator 5 are stacked in that order. The fuel electrode 2 has a structure in which a gas diffusion layer 21 and a catalyst layer 22 are stacked in that order from the side of the separator 1. The oxygen electrode 4 has a structure in which a gas diffusion layer 41 and a catalyst layer 42 are stacked in that order from the side of a separator 5.

The separators 1, 5 are constructed of an electrically conductive material such as stainless steel or the like. A side of the separator 1 toward the fuel electrode 2 has a fuel gas channel through which a fuel gas flows. A side of the separator 5 toward oxygen electrode 4 has an oxidant gas channel through which an oxidant gas flows.

The gas diffusion layer 21 is a layer for diffusing the fuel gas, and is constructed of an electrically conductive material such as carbon paper or the like. The catalyst layer 22 contains a catalyst, such as Pt (platinum), a Pt alloy, etc., for accelerating the protonization of hydrogen. The catalyst layer 22 also contains a water-electrolytic catalyst for accelerating the electrolysis of water. As the water-electrolytic catalyst, it is possible to use a metal, such as Pt, Ru (ruthenium), Ir (iridium), Au (gold), Ni (nickel), Ag, etc., an alloy, such as Pt—Ru, Pt—Ir, etc., a metal oxide, such as $RuO_2$, $IrO_2$, etc. The catalyst layer 22 has a structure in which the aforementioned water-electrolytic catalyst is added to, for example, Pt-supporting carbon, Pt alloy-supporting carbon, platinum black, etc. It is preferable that the supporting carbon be a highly crystallized carbon. This will improve the oxidation resistance of the catalyst layer 22.

The electrolyte membrane 3 is made of a solid polymer electrolyte, such as Nafion (registered trademark), a perfluorocarbon sulfonic acid polymer having proton conductivity, or the like. It is preferable that the water permeation rate of the electrolyte membrane 3 at −30° C. in a water-containing state be greater than or equal to $5 \times 10^{-4}$ $mmol/cm^2/sec$.

The gas diffusion layer 41 is a layer for diffusing the oxidant gas, and is constructed of an electrically conductive material such as carbon paper or the like. The catalyst layer 42 is constructed of an electrically conductive material that supports the catalyst. The catalyst in the catalyst layer 42 is a catalyst for accelerating the reaction between protons and oxygen. In this embodiment, the catalyst layer 42 is constructed of a platinum-supporting carbon.

Subsequently, the overall action of the fuel cell 10 will be described. Firstly, the fuel gas containing hydrogen, such as hydrogen gas, methanol gas, etc., is supplied to the gas diffusion layer 21, while flowing through the fuel gas channel of the separator 1. The fuel gas supplied to the gas diffusion layer 21 permeates through the gas diffusion layer 21 and reaches the catalyst layer 22. The hydrogen in the fuel gas that has reached the catalyst layer 22 dissociates into protons and electrons. As reaction formulas, the following formulas (1) and (2) are conceived. The protons are conducted through the electrolyte membrane 3, and reach the oxygen electrode 4.

$$H_2 \rightarrow 2H^+ + 2e^- \qquad (1)$$

$$CH_3OH + H_2O \rightarrow CO_2 + 6H^+ + 6e^- \qquad (2)$$

On the other hand, the oxidant gas containing oxygen is supplied to the gas diffusion layer 41 while flowing through the oxidant gas channel of the separator 5. The oxidant gas supplied to the gas diffusion layer 41 permeates through the gas diffusion layer 41 and reaches the catalyst layer 42. The protons and the oxygen in the oxidant gas that have reached the catalyst layer 42 produce water, generating electric power as well. The separator 1, 5 collect the generated electric power. Through the above-described actions, the fuel cell 10 generates electricity.

Subsequently, the operation of the fuel cell 10 at the time of fuel lack, such as the time of bad flow distribution, the time of startup, etc will be described below. When the fuel becomes lacking, hydrogen, which is dissociated into protons in the fuel electrode 2, becomes lacking. Therefore, in order to continue the electric power generation of the fuel cell 10, protons need to be dissociated from a material other than hydrogen. In this case, the water held in the fuel electrode 2 becomes dissociated mainly. As reaction formulas, the following formulas (3) and (4) are conceived.

$$2H_2O \rightarrow 4H^+ + 4e^- + O_2 \qquad (3)$$

$$2H_2O + C \rightarrow 4H^+ + 4e^- + CO_2 \qquad (4)$$

In this embodiment, since the catalyst layer 22 contains the water-electrolytic catalyst, the electrolysis of water is accelerated. Therefore, the reaction of the formula (3) is preferentially performed. Hence, the irreversible oxidative degradation of the carbon or the like contained in the fuel electrode 2 can be restrained.

Figure 2:
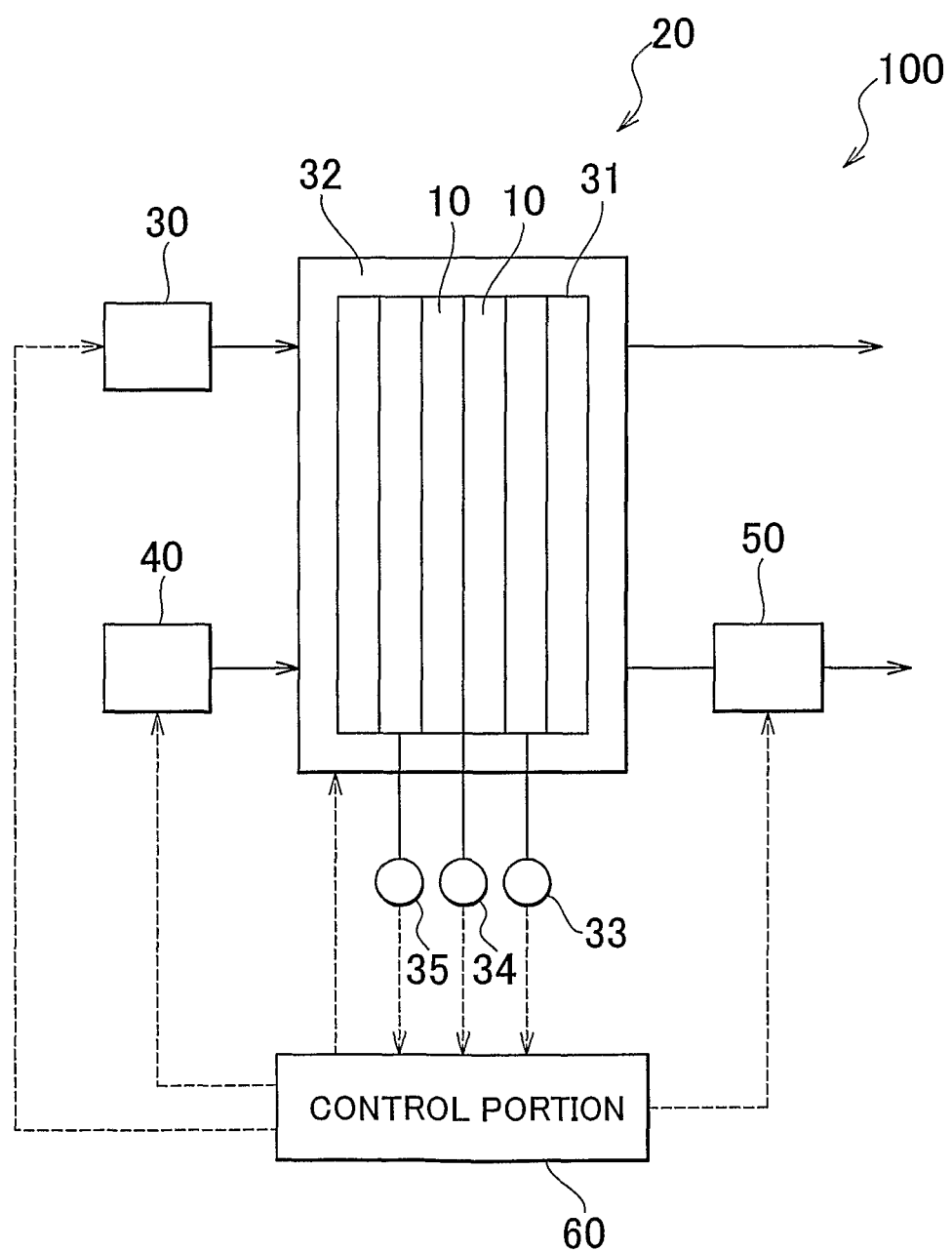
FIG. 2 is a schematic diagram showing an overall construction of a fuel cell system in accordance with a first embodiment of the invention.

Subsequently, the fuel cell system 100 in accordance with this embodiment will be described. FIG. 2 is a schematic diagram showing an overall construction of the fuel cell system 100 in accordance with this embodiment. As shown in FIG. 2, the fuel cell system 100 includes a fuel cell 20, fuel gas supply means 30, oxidant gas supply means 40, a back pressure control valve 50, and a control portion 60.

The fuel cell 20 includes a fuel cell stack 31, a heater 32, a voltage sensor 33, a temperature sensor 34, and a load sensor 35. The fuel cell stack 31 has a structure in which a plurality of fuel cells 10 as shown in FIG. 1 are stacked and fastened together. The heater 32 covers the fuel cell stack 31. The heater 32 controls the temperature of the fuel cell stack 31 in accordance with a command from the control portion 60.

The voltage sensor 33 detects the generated voltage of each fuel cell 10, and gives results of the detection to a control portion 60. The temperature sensor 34 detects the temperature of each fuel cell 10, and gives results of the detection to the control portion 60. The load sensor 35 detects the fastening load of the fuel cell stack 31, and gives results of the detection to the control portion 60. The load sensor 35 may be provided in the fashion of one for each fuel cell 10, or may also be provided in the fashion of one for the fuel cell stack 31.

The fuel gas supply means 30 and the oxidant gas supply means 40 are constructed of a pump or the like. The fuel gas supply means 30 is connected to a fuel gas inlet of the fuel cell 20. The oxidant gas supply means 40 is connected to an oxidant gas inlet of the fuel cell 20. The fuel gas supply means 30 supplies the hydrogen-containing fuel gas to the inlet of the fuel cell 20 in accordance with a command of the control portion 60. As the fuel gas, it is possible to use a hydrogen gas, a methanol gas, etc. The oxidant gas supply means 40 supplies the oxidant gas to the oxidant gas inlet of the fuel cell 20 in accordance with a command of the control portion 60. As the oxidant gas, it is possible to use air or the like.

The back-pressure control valve 50 is provided at an oxidant gas outlet of the fuel cell 20. The back-pressure control valve 50 controls the back pressure of the oxidant gas that flows within the fuel cell 20, in accordance with a command of the control portion 60. The control portion 60 is constructed of a CPU (central processing unit), a ROM (read-only memory), a RAM (random access memory), etc. The control portion 60 controls various portions of the fuel cell system 100 on the basis of detection results from the voltage sensor 33, the temperature sensor 34 and the load sensor 35.

Subsequently, the control of the fuel cell system 100 by the control portion 60 will be described with reference to FIGS. 3 to 7. Firstly, the control portion 60 controls the fuel gas supply means 30 and the oxidant gas supply means 40 so that the fuel gas and the oxidant gas are supplied to the fuel cell 20. Therefore, electric power generation is performed in the fuel cell 20. Next, the control portion 60 determines whether or not fuel is lacking in the fuel cell 20. It is to be noted herein that, as for the fuel cell 10 that is lacking in fuel, the generated voltage becomes minus. This will be explained in detail with reference to FIG. 3.

Figure 3:
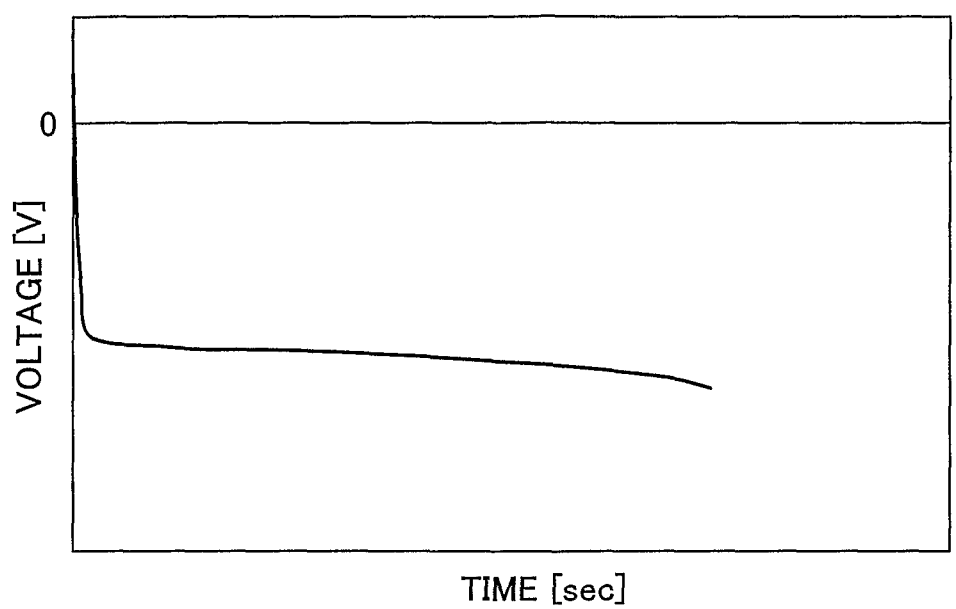
FIG. 3 is a diagram showing the generated voltage of a fuel cell that is lacking in fuel.

FIG. 3 is a diagram showing the generated voltage of a fuel cell 10 that is lacking in fuel. In FIG. 3, the vertical axis shows the generated voltage of the fuel cell 10, and the horizontal axis shows the elapsed time. As shown in FIG. 3, when the fuel becomes lacking, the generated voltage sharply declines. This is because protons are dissociated from a material other than the fuel. After that, the breadth of decline of the generated voltage becomes smaller. This is because the reaction of the formula (3) occurs through the water-electrolytic catalyst, so that protons continue to be supplied to the electrolyte membrane 3. If the state of fuel lack further continues, the generated voltage sharply declines. This is because the water-electrolytic catalyst degrades and therefore the reaction of the formula (4) occurs instead of the reaction of the formula (3). From the above discussion, the control portion 60 can determine that the fuel is lacking in a fuel cell 10 if the generated voltage of the fuel cell 10 is less than or equal to 0 V.

In the case where it has been determined that the fuel is lacking, the control portion 60 determines whether or not the temperature of that fuel cell 10 is below the freezing point. The control portion 60 performs this determination on the basis of a detection result from the temperature sensor 34. Below the freezing point, water freezes, and therefore is not supplied to the catalyst layer 22. In this case, the water held in the electrolyte membrane 3 moves to the catalyst layer 22, and is electrolyzed through the water-electrolytic catalyst. Hence, the membrane thickness of the electrolyte membrane 3 becomes small. As a result, the fastening load of the fuel cell stack 31 declines.

Figure 4:
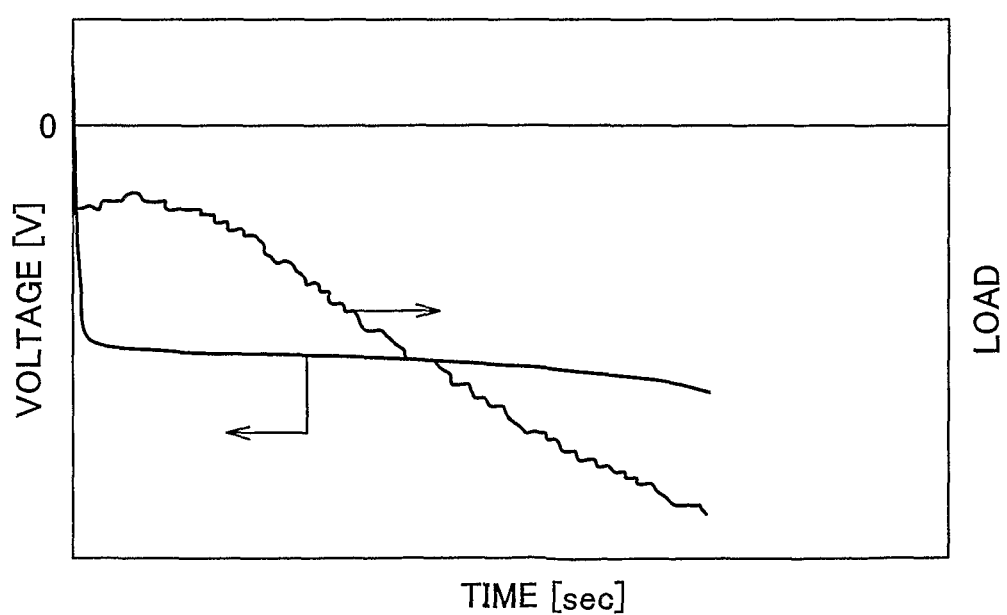
FIG. 4 is a diagram showing a relationship between the generated voltage of a fuel cell and the fastening load of the fuel cell stack.

A relationship between the generated voltage of the fuel cell 10 and the fastening load of the fuel cell stack 31 when the fuel is lacking and the temperature is below the freezing point will be described. FIG. 4 is a diagram showing the relationship between the generated voltage of the fuel cell 10 and the fastening load of the fuel cell stack 31. In this case, both the fuel electrode 2 and the oxygen electrode 4 are supplied with nitrogen gas, and the temperature of the fuel cell 10 is set at −20° C., and the current density of the fuel cell 10 is set at 0.1 A/cm$^2$. The left-side vertical axis in FIG. 4 shows the generated voltage of the fuel cell 10, and the right-side vertical axis in FIG. 4 shows the fastening load of the fuel cell stack 31, and the horizontal axis in FIG. 4 shows the elapsed time.

As shown in FIG. 4, as the state of fuel lack continues, the fastening load of the fuel cell stack 31 gradually declines. Hence, if the load detected by the load sensor 35 declines, it can be determined that the water content amount in the electrolyte membrane 3 being in the state of fuel lack and having temperature of below the freezing point is declining. Therefore, the control portion 60 determines whether or not the load detected by the load sensor 35 declines. In this case, the control portion 60 may also determine whether or not the load detected by the load sensor 35 continuously declines, or may also determine whether or not the load detected by the load sensor 35 declines at an interval of a predetermined time.

If it is determined that the load detected by the load sensor 35 declines, the control portion 60 controls the back pressure control valve 50 so as to increase the back pressure of the oxidant gas supplied to the fuel cell 20. In this case, the power generation-produced water formed in the oxygen electrode 4 moves to the side of the electrolyte membrane 3 and the fuel electrode 2. Therefore, the electrolyte membrane 3 can sufficiently absorb water, and the electrolysis of water in the fuel electrode 2 can be continued.

Figure 5:
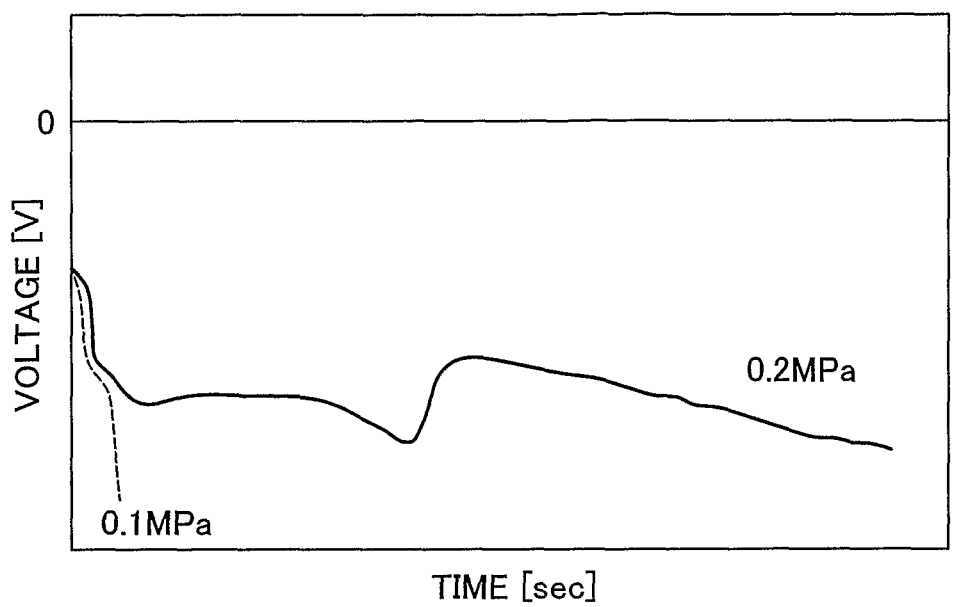
FIG. 5 is a diagram showing a relationship between the back pressure of an oxidant gas and the generated voltage of a fuel cell.

A relationship between the back pressure of the oxidant gas and the generated voltage of the fuel cell 10 when the fuel is lacking and the temperature is below the freezing point will be described. FIG. 5 is a diagram showing a relationship between the back pressure of the oxidant gas and the generated voltage of the fuel cell 10. In this case, the fuel electrode 2 is supplied with nitrogen gas and the oxygen electrode 4 is supplied with air, and the temperature of the fuel cell 10 is set at −20° C., and the current density of the fuel cell 10 is set at 0.15 A/cm$^2$. In FIG. 5, the vertical axis shows the generated voltage of the fuel cell 10, and the horizontal axis shows the elapsed time. The solid line shows a case where the back pressure of the oxidant gas is 0.2 MPa, and the dashed line shows a case where the back pressure of the oxidant gas is 0.1 MPa.

As shown in FIG. 5, in the case where the back pressure is 0.1 MPa, the generated voltage sharply declines. A reason for this is considered to be that since the back pressure of the oxidant gas is small, water is not supplied from the oxygen electrode 4 to the fuel electrode 2. On the other hand, in the case where the back pressure is 0.2 MPa, a value the generated voltage within a certain range is maintained. A reason for this is considered to be that water is supplied from the oxygen electrode 4 to the fuel electrode 2 so that the electrolysis of water continues.

Incidentally, in order for water to promptly move from the oxygen electrode 4 to the fuel electrode 2, the water permeation rate of the electrolyte membrane 3 needs to be greater than a predetermined value. A relationship between the water permeation rate of the electrolyte membrane 3 and the generated voltage of the fuel cell 10 when the fuel is lacking and the temperature is below the freezing point will be described.

Figure 6:
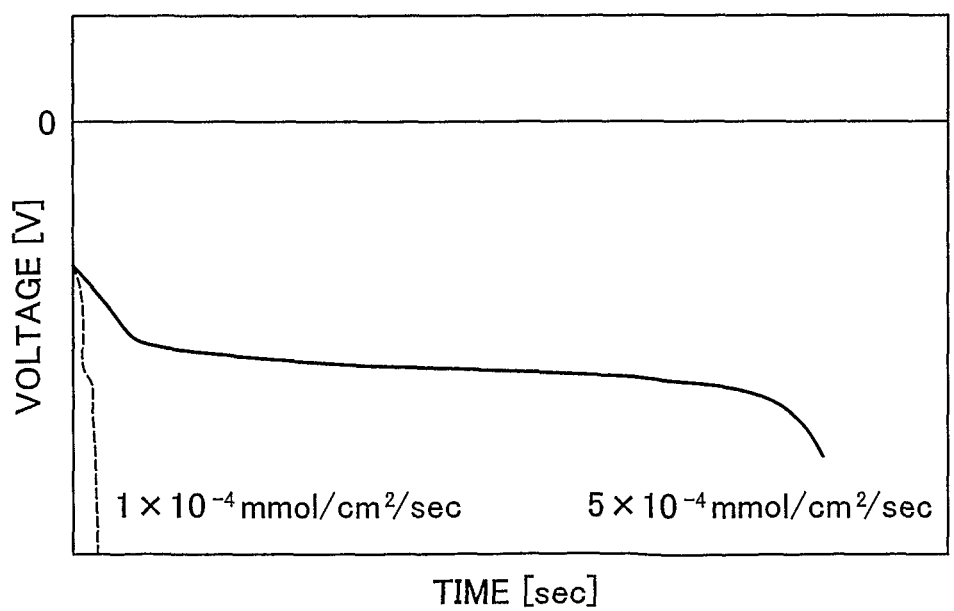
FIG. 6 is a diagram showing a relationship between the water permeation rate of an electrolyte membrane and the generated voltage of the fuel cell.

FIG. 6 is a diagram showing a relationship between the water permeation rate of the electrolyte membrane 3 and the generated voltage of the fuel cell 10. In this case, the fuel electrode 2 is supplied with nitrogen gas and the oxygen electrode 4 is supplied with air, the temperature of the fuel cell 10 is set at −30° C., and the current density of the fuel cell 10 is 0.1 A/cm$^2$. In FIG. 6, the vertical axis shows the generated voltage of the fuel cell 10, and the horizontal axis shows the elapsed time. The solid line shows a case where the water permeation rate of the electrolyte membrane 3 is $5\times10^{-4}$ mmol/cm$^2$/sec, and the dashed line shows a case where the water permeation rate of the electrolyte membrane 3 is $1\times10^{-4}$ mmol/cm$^2$/sec.

As shown in FIG. 6, in the case where the water permeation rate is $1\times10^{-4}$ mmol/cm$^2$/sec, the generated voltage sharply declines. A reason for this is considered to be that since the water permeation rate is small, the supply of water from the oxygen electrode 4 to the fuel electrode 2 is not sufficiently performed. On the other hand, in the case where the water permeation rate is $5\times10^{-4}$ mmol/cm$^2$/sec, a value of the generated voltage within a certain range is maintained for a long time. A reason for this is considered to be that water is sufficiently supplied from the oxygen electrode 4 to the fuel electrode 2 so that the electrolysis of water continues. Hence, it is preferable that the water permeation rate of the electrolyte membrane 3 be greater than or equal to $5 \times 10^{-4}$ mmol/cm$^2$/sec.

The control portion 60, after increasing the back pressure of the oxidant gas, determines again whether or not the fastening load of the fuel cell stack 31 is declining. If the fastening load of the fuel cell stacks 31 declines despite the increase of the back pressure of the oxidant gas, the control portion 60 controls the heater 32 so as to heat the fuel cell stack 31. In this case, the water permeation rate of the electrolyte membrane 3 increases. Therefore, water more readily moves from the side of the oxygen electrode 4 to the side of the fuel electrode 2. As a result, the electrolysis of water in the fuel electrode 2 continues.

Figure 7:
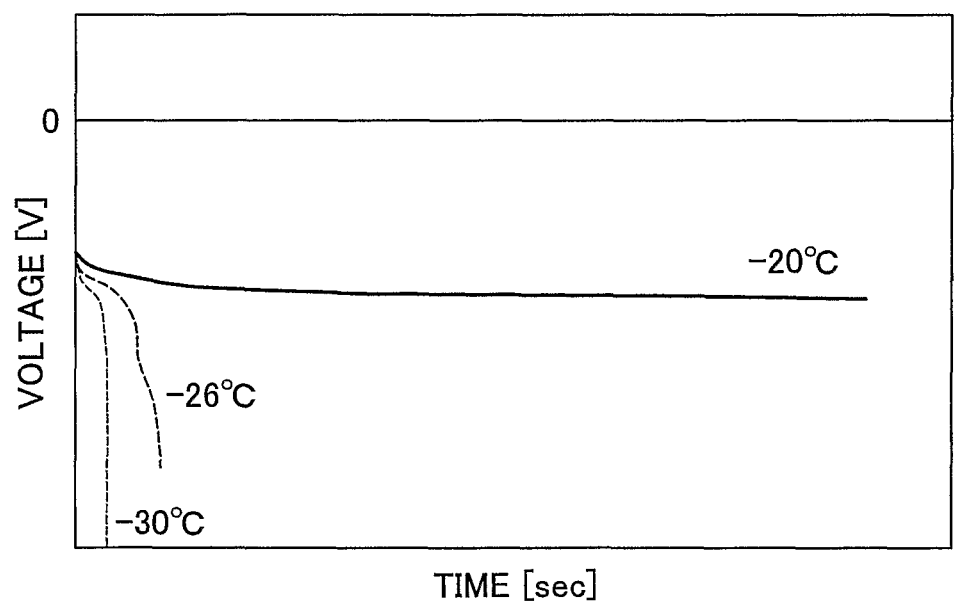
FIG. 7 is a diagram showing a relationship between the temperature of a fuel cell and the generated voltage of the fuel cell.

A relationship between the temperature of the fuel cell 10 and the generated voltage of the fuel cell 10 when the fuel is lacking and the temperature is below the freezing point will be described. FIG. 7 is a diagram showing a relationship between the temperature of the fuel cell 10 and the generated voltage of the fuel cell 10. In this case, the fuel electrode 2 is supplied with nitrogen gas and the oxygen electrode 4 is supplied with air, and the current density of the fuel cell 10 is set at 0.1 A/cm$^2$. In FIG. 7, the vertical axis shows the generated voltage of the fuel cell 10, and the horizontal axis shows the elapsed time. The solid line shows a case where the temperature of the fuel cell 10 is −20° C., and the dashed line shows a case where the temperature of the fuel cell 10 is −26° C., and the dotted line shows a case where the temperature of the fuel cell 10 is −30° C.

As shown in FIG. 7, in the case where the temperature of the fuel cell 10 is −30° C. or −26° C., the generated voltage of the fuel cell 10 sharply declines. A reason for this is considered to be that the water permeation rate of the electrolyte membrane 3 is small so that water is not sufficiently supplied to the fuel electrode 2. On the other hand, in the case where the temperature of the fuel cell 10 is −20° C., the generated voltage of the fuel cell 10 remains at a value within a certain range for a long time. A reason for this is considered to be that the water permeation rate of the electrolyte membrane 3 increases so that water is sufficiently supplied to the fuel electrode 2.

Thus, even in the case where the fuel is lacking and the temperature is below the freezing point, water can be sufficiently supplied from the oxygen electrode 4 to the fuel electrode 2 by increasing the temperature of the electrolyte membrane 3. Therefore, degradation of the fuel electrode 2 can be restrained, and degradation of the electrolyte membrane 3 can also be restrained. In particular, in the case of a fluorine-based electrolyte membrane, such as Nafion or the like, the water permeation rate declines sharply at a critical point of −26° C. Hence, it is preferable that the electrolyte membrane 3 be heated to or above −26° C.

Figure 8:
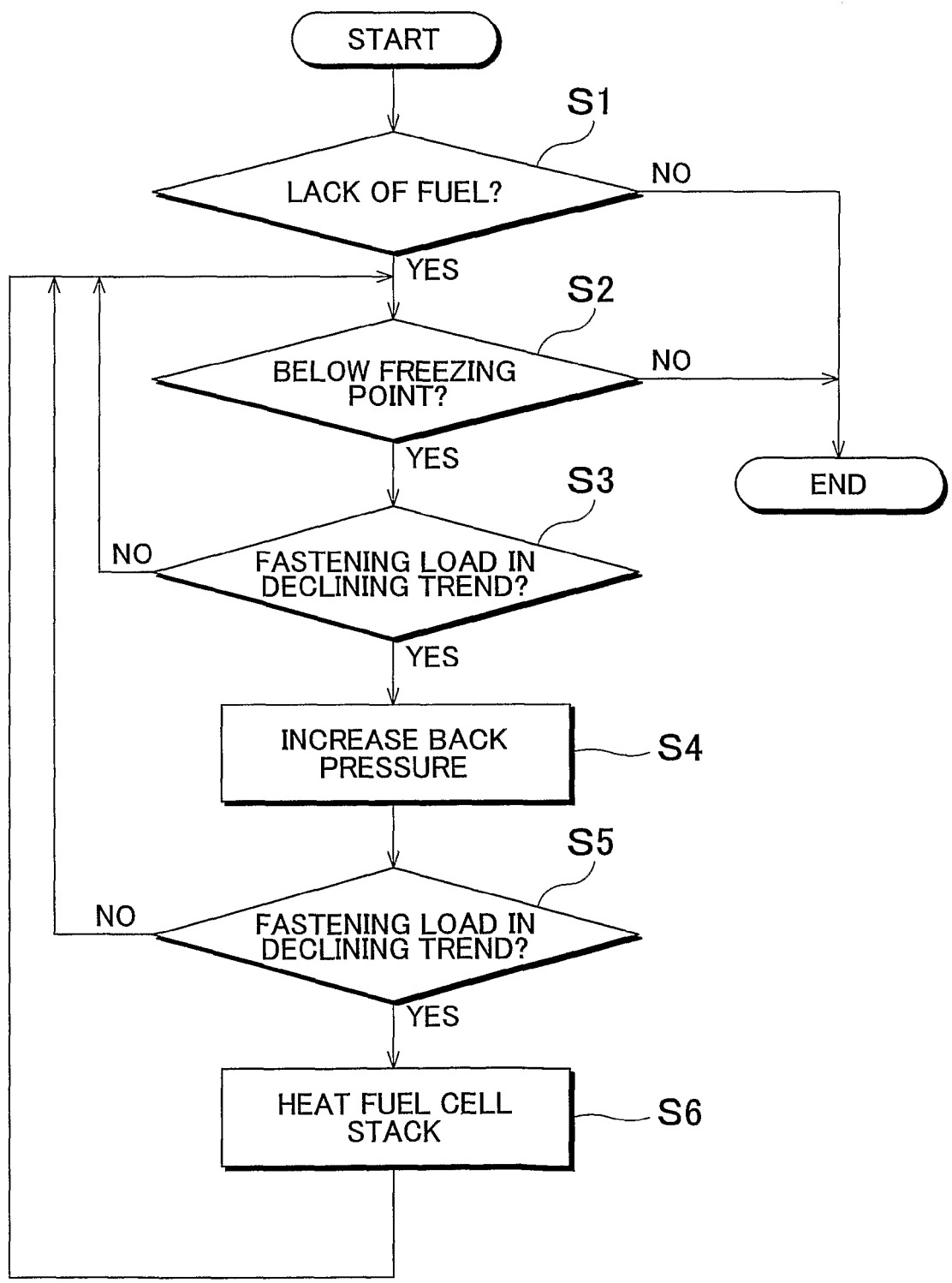
FIG. 8 is a flowchart showing an example of the control of the fuel cell system by a control portion during the power generation of the fuel cell.

FIG. 8 is a flowchart showing an example of the control of the fuel cell system 100 performed by the control portion 60 during the power generation of the fuel cell 20. The control portion 60 executes the process shown by the flowchart of FIG. 8 in every predetermined cycle. As shown in FIG. 8, the control portion 60 firstly determines whether or not any one of the fuel cells 10 is in the state of fuel lack (step S1). In this case, the control portion 60 performs this determination by determining whether or not the generated voltage of any fuel cell 10 is less than or equal to 0 V on the basis of a result of the detection by the voltage sensor 33.

If it is determined that a fuel cell 10 is in the state of fuel lack in step S1, the control portion 60 then determines whether or not the temperature of that fuel cell 10 is below the freezing point (step S2). In this case, the control portion 60 performs this determination on the basis of a detection result of the temperature sensor 34. If it is determined that the temperature of the fuel cell 20 below the freezing point in step S2, the control portion 60 then determines whether or not the fastening load of the fuel cell stack 31 is in a declining trend (step S3). In this case, the control portion 60 performs the determination by determining whether or not the fastening load is declining at predetermined time intervals on the basis of detection results of the load sensor 35.

If it is determined that the fastening load of the fuel cell stack 31 is in a declining trend in step S3, the control portion 60 controls the back pressure control valve 50 so as to increase the back pressure of the oxidant gas to, for example, 0.2 MPa (step S4). Next, the control portion 60 determines again whether or not the fastening load of the fuel cell stack 31 is in a declining trend (step S5). If it is determined that the fastening load of the fuel cell stack 31 is in a declining trend in step S5, the control portion 60 controls the heater 32 so as to heat the fuel cell stack 31 (step S6). In this case, the control portion 60 continues the heating by the heater 32 so that the temperature of the fuel cell stack 31 becomes equal to or higher than −26° C. After that, the control portion 60 repeats the process starting at step S2.

Incidentally, if it is not determined that any one of the fuel cells 10 is in the state of fuel lack in step S1, or if it is not determined that the temperature of the fuel cell 10 is below the freezing point in step S2, the control portion 60 ends the process. Therefore, the fuel cell 20 continues generating power. If it is not determined that the fastening load of the fuel cell stack 31 is in a declining trend in step S3 or step S5, the control portion 60 repeats the process starting in step S2.

Thus, according to the control following the flowchart of FIG. 8, even in the case where any one of the fuel cells 10 is lacking in fuel and has temperature below the freezing point, the electrolysis can be continued by using water other than the water held in the electrolyte membrane 3. Therefore, degradation of the fuel electrode 2 can be restrained, and degradation of the electrolyte membrane 3 can also be degraded.

In this embodiment, the back pressure control valve 50 can be regarded as movement means (a movement portion) and back-pressure adjustment means. The load sensor 35 can be regarded as water content detection means (water content detection portion) and load detection means. The control portion 60 can be regarded as first determination means, second determination means and control means. The voltage sensor 33 can be regarded as generated voltage detection means. The temperature sensor 34 can be regarded as temperature detection means.

Figure 9:
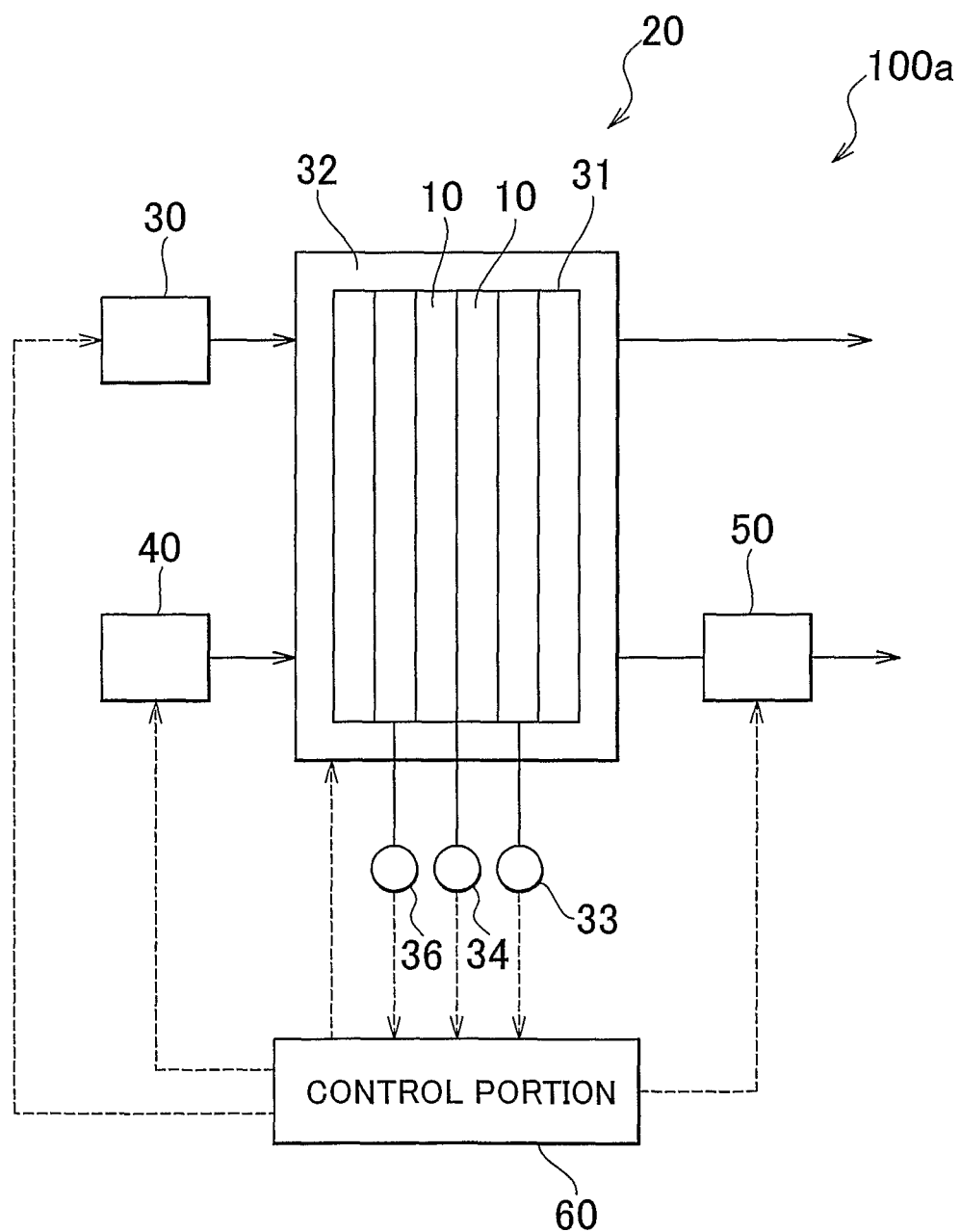
FIG. 9 is a schematic diagram showing an overall construction of a fuel cell system in accordance with a second embodiment.

Subsequently, a fuel cell system 100a in accordance with a second embodiment of the invention will be described. FIG. 9 is a schematic diagram showing an overall construction of the fuel cell system 100a. As shown in FIG. 9, the fuel cell system 100a is different from the fuel cell system 100 shown in FIG. 2, in that a resistance sensor 36 is provided instead of the load sensor 35. The resistance sensor 36 detects the electrical resistance of the electrolyte membrane 3 of each fuel cell 10, and gives a result of the detection to the control portion 60.

A relationship between the electrical resistance of the electrolyte membrane 3 and the generated voltage of the fuel cell 10 when the fuel is lacking and the temperature is below the freezing point. FIG. 10 is a diagram showing a relationship between the generated voltage of the fuel cell 10 and the electrical resistance of the electrolyte membrane 3. In this case, both the fuel electrode 2 and the oxygen electrode 4 are supplied with nitrogen gas, and the temperature of the fuel cell 10 is set at −20° C., and the current density of the fuel cell 10 is set at 0.1 A/cm$^2$. Besides, changing the amount of water held in the membrane changes the electrical resistance of each electrolyte membrane 3. The greater the amount of water held in the membrane, the smaller the electrical resistance of the electrolyte membrane 3. The smaller the amount of water held in the membrane, the greater the electrical resistance of the electrolyte membrane 3.

The vertical axis in FIG. 10 shows the generated voltage of the fuel cell 10, and the horizontal axis in FIG. 10 shows the elapsed time. As shown in FIG. 10, as the electrical resistance of the electrolyte membrane 3 becomes greater, the time during which the breadth of decline of the generated voltage is relatively small becomes shorter. Therefore, if the electrical resistance of the electrolyte membrane 3 is great, degradation of the electrolyte membrane 3 progresses, and degradation of the fuel electrode 2 also progresses. Hence, if the electrical resistance of the electrolyte membrane 3 is great, it is necessary to supply water or moisture to the electrolyte membrane 3 and the fuel electrode 2.

In this embodiment, if the fuel is lacking and the temperature is below the freezing point, the control portion 60 determines whether or not the water held in the electrolyte membrane 3 is decreasing on the basis of the electrical resistance of the electrolyte membrane 3. In this case, the control portion 60 may perform this determination on the basis of whether or not the resistance of detected by the resistance sensor 36 continuously increases, or may also perform the determination on the basis of whether or not the resistance detected by the resistance sensor 36 increases at predetermined time intervals.

If it is determined that the water held in the electrolyte membrane 3 is decreasing, the control portion 60 controls the back pressure control valve 50 so as to increase the back pressure of the oxidant gas supplied to the fuel cell 20. In this case, the power generation-produced water formed at the oxygen electrode 4 moves to the side of the electrolyte membrane 3 and the fuel electrode 2. Therefore, the electrolyte membrane 3 can sufficiently absorb water, and the electrolysis of water in the fuel electrode 2 continues to be performed.

Figure 11:
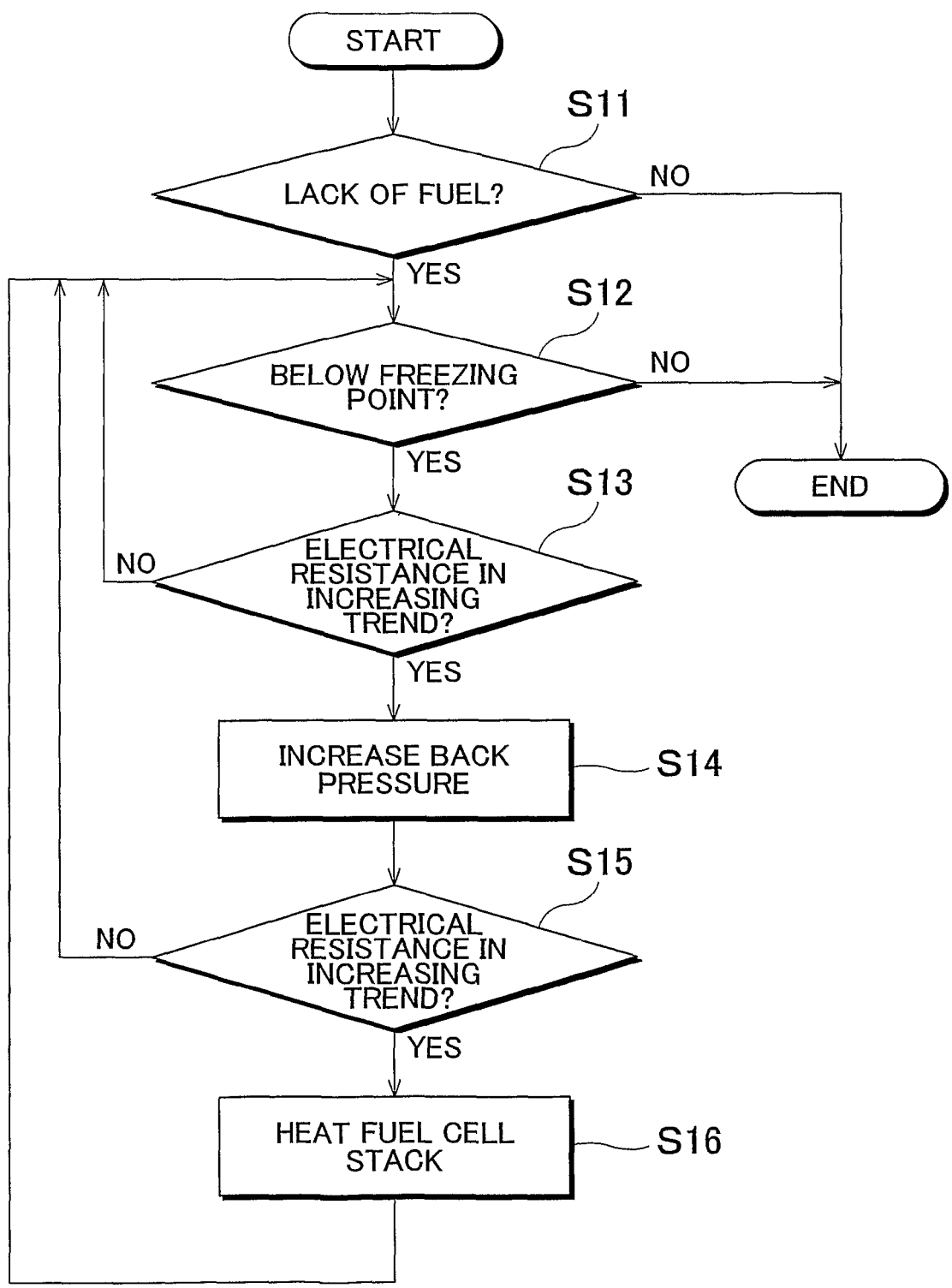
FIG. 11 is a flowchart showing an example of the control of the fuel cell system by the control portion during the power generation of the fuel cell.

FIG. 11 is a flowchart showing an example of the control of the fuel cell system 100a performed by the control portion 60 during the power generation of the fuel cell 20. The control portion 60 executes the process shown by the flowchart of the FIG. 11 in every predetermined cycle. As shown in FIG. 11, the control portion 60 firstly determines whether or not any one of the fuel cells 10 is in a state of fuel lack (step S11). If it is determined that a fuel cell 10 is in the state of fuel lack in step S11, the control portion 60 then determines whether or not the temperature of the fuel cell 10 is below the freezing point (step S12).

If it is determined that the temperature of the fuel cell 10 is below the freezing point in step S12, the control portion 60 determines whether or not the electrical resistance of the electrolyte membrane 3 included in the fuel cell 10 is in an increasing trend (step S13). In this case, the control portion 60 performs this determination by determining whether or not the electrical resistance of the electrolyte membrane 3 is increasing at predetermined time intervals on the basis of a result of detection of the resistance sensor 36.

If it is determined that the electrical resistance of the electrolyte membrane 3 is in an increasing trend in step S13, the control portion 60 controls the back pressure control valve 50 so as to increase the back pressure of the oxidant gas (step S14). Next, the control portion 60 determines again whether or not the electrical resistance of the electrolyte membrane 3, which was determined to be in an increasing trend in step S13, is in an increasing trend (step S15). If it is determined that the electrical resistance of the electrolyte membrane 3 is in an increasing trend in step S15, the control portion 60 controls the heater 32 so as to heat the fuel cell stack 31 (step S16). After that, the control portion 60 repeats the process starting at step S12.

If it is not determined that the fuel cell 10 is in a state of fuel lack in step S11, or if it is not determined that the temperature of the fuel cell 10 is below the freezing point in step S12, the control portion 60 ends the operation. Therefore, the fuel cell 20 continues generating power. If it is not determined that the electrical resistance of the electrolyte membrane 3 is in an increasing trend in step S13 or step S15, the control portion 60 repeats the process starting at step S12.

Thus, according to the control following the flowchart of FIG. 11, even if the fuel is lacking and the temperature of the fuel cell 10 is below the freezing point, the electrolysis can be continued by using water other than the water held in the electrolyte membrane 3. Therefore, degradation of the fuel electrode 2 can be restrained, and degradation of the electrolyte membrane 3 can be restrained.

In this embodiment, the resistance sensor 36 can be regarded as resistance detection means.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A fuel cell system comprising:
a fuel cell that includes a solid polymer electrolyte membrane, and an anode electrode that comprises a carbon material and a water-electrolytic catalyst,
a movement portion that moves water from an oxygen electrode of the fuel cell to a side of a fuel electrode;
a water content detection portion that detects a water content of the solid polymer electrolyte membrane; and
a control portion that controls the movement portion on the basis of a result of detection of the water content detection portion and the state of fuel sufficiency, wherein the control portion controls the movement portion to move water from the oxygen electrode to the fuel electrode if there is a decline in the water content of the solid polymer electrolyte membrane and there is a lack of fuel.

2. The fuel cell system according to claim 1, wherein the movement portion comprises a back-pressure adjustment portion that adjusts a back pressure of an oxidant gas that is supplied to the fuel cell.

3. The fuel cell system according to claim 2, wherein the control portion controls the back-pressure adjustment portion so that the back pressure of the oxidant gas increases, if it is determined that the water content of the solid polymer electrolyte membrane declines.

4. The fuel cell system according to claim 1, wherein the movement portion comprises a heater that heats the fuel cell.

5. The fuel cell system according to claim 4, wherein the control portion controls the heater so that the temperature of the fuel cell rises, if it is determined that the water content of the solid polymer electrolyte membrane declines.

6. The fuel cell system according to claim 1, wherein a water permeation rate of the solid polymer electrolyte membrane is greater than or equal to $5 \times 10^{-4}$ mmol/cm$^2$/sec.

7. The fuel cell system according to claim 1,
wherein the water content detection portion comprises a resistance detection portion that detects an electrical resistance of the solid polymer electrolyte membrane, and
wherein an increase in the electrical resistance of the solid polymer electrolyte membrane indicates a decline in the water content of the solid polymer electrolyte membrane.

8. The fuel cell system according to claim 1, further comprising a fuel cell stack in which a plurality of fuel cell units are stacked,
wherein the water content detection portion comprises a load detection portion that detects an electrical load of the fuel cell stack, and
wherein a decline in the electrical load of the fuel cell stack indicates a decline in the water content of the solid polymer electrolyte membrane.

9. The fuel cell system according to claim 1, further comprising a generated voltage detection portion that detects a generated voltage of the fuel cell,
wherein the generated voltage of the fuel cell being less than or equal to a predetermined value indicates a state of fuel lack.

10. The fuel cell system according to claim 1, further comprising a temperature detection portion that detects temperature of the fuel cell,
wherein the control portion controls the movement portion so as to move water from the oxygen electrode to the fuel electrode, if the temperature of the fuel cell is below the water freezing point and it is determined that the water content of the solid polymer electrolyte membrane declines.

11. The fuel cell system according to claim 1, wherein the carbon material in the anode is in crystallized form.

* * * * *

UNITED STATES PATENT AND TRADEMARK OFFICE
CERTIFICATE OF CORRECTION

PATENT NO.       : 8,426,075 B2
APPLICATION NO. : 12/294494
DATED            : April 23, 2013
INVENTOR(S)      : Tohru Morita Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this
Eighth Day of September, 2015

Michelle K. Lee
*Director of the United States Patent and Trademark Office*